(No Model.)
J. DANIELS.
GRAPHOPHONE.
No. 436,576.   Patented Sept. 16, 1890.
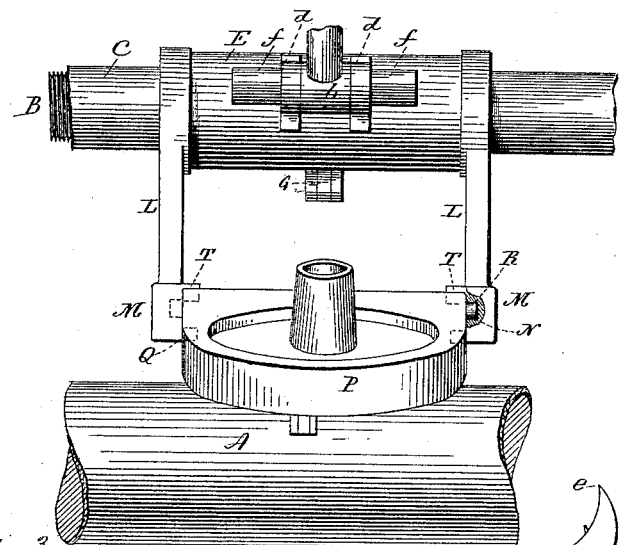
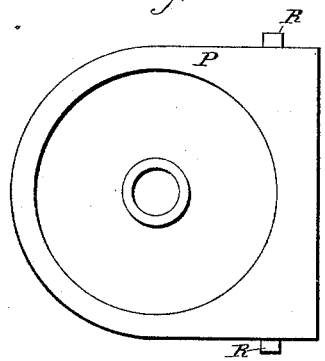
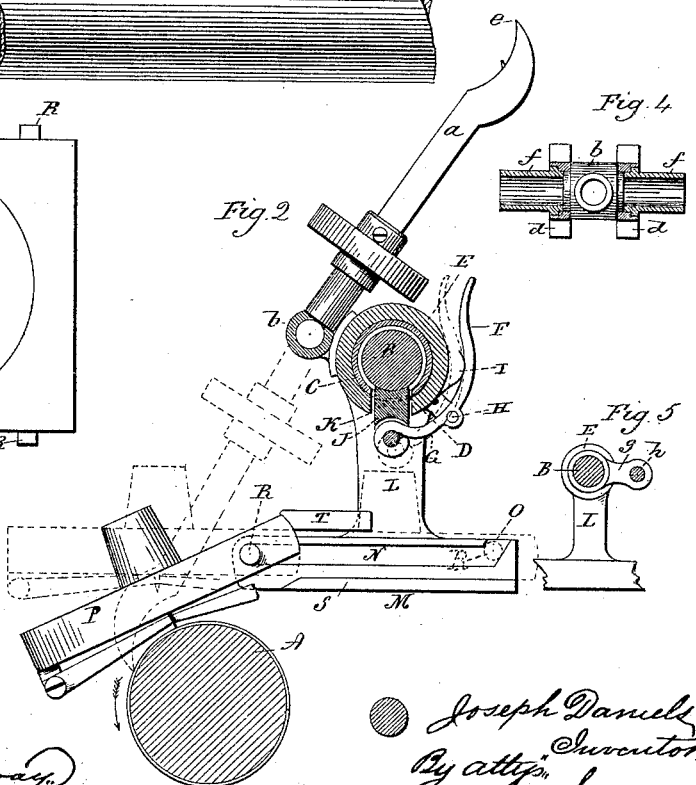
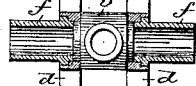
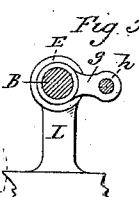
Witnesses
J. H. Shumway
Lillian D. Kelsey
Joseph Daniels
Inventor
By attys
Earle & Seymour

UNITED STATES PATENT OFFICE.

JOSEPH DANIELS, OF HARTFORD, CONNECTICUT, ASSIGNOR TO THE EDISON UNITED PHONOGRAPH COMPANY, OF NEW YORK.

GRAPHOPHONE.

SPECIFICATION forming part of Letters Patent No. 436,576, dated September 16, 1890.

Application filed April 30, 1890. Serial No. 350,028. (No model.)

*To all whom it may concern:*

Be it known that I, JOSEPH DANIELS, of Hartford, in the county of Hartford and State of Connecticut, have invented a new Improvement in Graphophones; and I do hereby declare the following, when taken in connection with accompanying drawings and the letters of reference marked thereon, to be a full, clear, and exact description of the same, and which said drawings constitute part of this specification, and represent, in—

Figure 1, a front view of the bracket, showing the recorder as in the working position, the reproducer turned up out of position, and so much of the instrument as necessary for the illustration of the invention, a portion of the reproducer broken away, and a portion of one of the brackets in section to show the trunnion of the recorder; Fig. 2, a transverse vertical section in a central line through the sleeve of the bracket, showing side view of the recorder and reproducer; Fig. 3, a top view of the recorder detached; Fig. 4, a longitudinal central section through the hub of the reproducer and tubes $ff$ detached, and Fig. 5 a modification.

This invention relates to an improvement in the instrument for recording and reproducing audible sounds, commonly called "graphophone."

In the usual construction of the graphophone the recorder and the reproducer have each been constructed with an independent bracket to be detachably applied to the leading-screw, and so that the requisite longitudinal movement would be imparted to either the recorder or reproducer, as the case may be, to properly traverse the surface of the cylinder. The recorder and reproducer being each independent of the other, one is necessarily removed to apply the other. This interchanging of the recorder and reproducer is not only inconvenient, but requires the utmost care in the application and adjustment to avoid injury to the cylinder. Again, the recorder and transmitter being detachable, are much more liable to injury than when made a permanent part of the instrument.

The object of my invention is a construction in which the recorder and reproducer may both be permanently attached to the instrument and always maintain the same relative position to each other, so that the reproducer may with positive certainty find its proper position on the cylinder with relation to the work which has been previously produced thereon by the recorder; and the invention consists, essentially, in a bracket arranged upon the leading-screw shaft, and so as to travel therewith in a line parallel with the cylinder, combined with a recorder and reproducer, both hung in the same bracket, and so as to positively move therewith, each being adapted to be applied to the surface of the cylinder or removed therefrom, as occasion may require, and in details of construction, as more fully hereinafter described, and particularly recited in the claims.

In illustrating the invention I show only so much of the instrument as is necessary for the illustration of the invention, to wit:

A represents the cylinder, upon which the record is made, and from which the reproduction is taken.

B represents the leading-screw parallel with the cylinder A, the revolution of the leading-screw governing the travel of the recorder and reproducer, the cylinder and leading-screw revolving together, as usual in graphophones. The leading-screw B is arranged within a stationary tubular shaft C, the shaft being constructed with a longitudinal slot D, preferably upon its under side, and so that the said tubular shaft incloses the screw except as to the slot D, which permits connection to be made with the screw from outside the shaft.

On the shaft C a tubular sleeve E is arranged, so as to move freely longitudinally on the said shaft C. This sleeve E carries a two-armed lever F G, hung to the slide upon a pivot H, the lever extending circumferentially of the sleeve, one arm F forming a finger-piece by which the lever may be operated, a suitable spring, as I, serving to turn the lever to throw the handle F outward, as seen in Fig. 2, the lever yielding for the drawing of the handle F toward the sleeve, as represented in broken lines, Fig. 2. The other arm G of the lever carries a segmental nut J, which works through a corresponding opening K in the under side of the sleeve and through the slot D in the tubular shaft, the inner end of the nut J being threaded corresponding to the thread of the leading-screw B, and so that normally the spring I will hold the said nut J in engagement with the leading-screw, as seen in Fig. 2, but so that as the handle F is drawn toward the slide the nut will be correspondingly withdrawn from the leading-screw, as represented in broken lines, Fig. 2. When the nut is engaged with the leading-screw, the sleeve E will travel longitudinally on its shaft corresponding to the thread of the leading-screw; but when disengaged the sleeve E will remain stationary. The nut working through the slot D in the stationary tubular shaft C serves to prevent the rotation of the sleeve E on the shaft, and so that it is stationary circumferentially, but free to travel longitudinally. From each of the ends of the sleeve E inverted-T-shaped arms L extend downward, these arms with the sleeve forming the bracket for carrying the recorder and reproducer. The cross M of the T-shaped arms L stands substantially horizontal.

Upon the inner side of the crosses M grooves N are formed, closed at the forward or cylinder end, but preferably opened upward, as at O at the rear end. (See Fig. 2.)

P represents the recorder, which, so far as the mechanism to produce the record is concerned, is of usual construction and does not require particular description. The width of the body of the recorder corresponds to the width between the two arms, and near the rear end on each side a trunnion R is formed, in diameter corresponding to the width of the grooves N in the bracket and so that the trunnions resting in those grooves, as seen in Fig. 1, serve to support the rear side of the recorder, and when drawn forward to bring those trunnions to the forward end of the groove, as seen in Fig. 2. The recorder may turn freely up or down, as upon pivots and as indicated in broken lines, Fig. 2. The trunnions permit the recorder to be moved backward and forward in the grooves N, and if drawn to the extreme rear, so as to bring the trunnions to the opening from the rear end of the slot, the recorder may be withdrawn from that side. The opening O is turned upward, so as to prevent the accidental removal of the recorder. The turned-up end of the groove requires that the trunnion shall be lifted upward from the groove before the recorder can be removed.

To support the recorder when moved rearward a ledge S is formed upon the inside of one or both brackets beneath the grooves and so that the under surface of the recorder will lie on the said ledge when in the rear position, as indicated in broken lines, Fig. 2, and be supported in substantially a horizontal plane, the ledges extending forward only so far as to permit them to support the recorder, but so as to allow the recorder to drop down when moved to its forward position, as seen in Fig. 2, this forward position being such as to permit the recorder to rest upon the cylinder for operation, as usual in graphophones. The revolution of the cylinder being in the direction indicated by the arrow, the natural tendency of such revolution is to hold the recorder in its forward position, but to prevent accidental rear movement of the recorder when in operation a lug T is formed on one or both arms of the bracket near the forward end and so that as the recorder reaches its extreme forward position, as seen in Fig. 2, and is turned downward the rear edge of the recorder will pass up forward of the forward end of the said lugs T and so that the recorder will take a bearing against the forward end of the lugs to prevent accidental rear movement, yet so as not to interfere with an up and down swinging movement of the recorder. The lugs T also prevent the recorder dropping onto the cylinder until the recorder has reached its extreme forward position—that is, until the trunnions R have been brought to their seats at the forward ends of the grooves N. This arrangement of the recorder permits one recorder to be readily removed and another introduced, so that recorders of different sensitiveness may be interchanged the one for the other, to adapt the instrument to louder or softer voices or sounds, a louder voice or sound requiring a less sensitive diaphragm than a softer voice in order to produce the proper effect upon the cylinder.

The reproducing-arm $a$ is of usual construction, whereby the grooves formed on the cylinder may, through the said arm, reproduce the sound, it being deemed unnecessary to describe the construction of this arm in detail. The arm is constructed with a hub $b$, which hub is arranged between forwardly-projecting ears $d\ d$ on the sleeve E, the axis of this hub being parallel with the axis of the leading-screw and cylinder, and the arm terminating, as at $e$, and provided with the usual device for following the groove in the cylinder, so that when turned upon the cylinder it will follow in the groove formed in the cylinder by the recording-instrument. The reproducing-arm swings upward and backward in a plane at right angles to the axis of the cylinder and leading-screw, as from the position seen in Fig. 2 to that in broken lines, same figure, so that when turned up it falls backward onto the sleeve and so as to rest there by its own gravity in a position out of engagement with the cylinder, this position being that which is necessary when the recorder is at work; but when the recorder is thrown out of work and into its place of rest, then the reproducer is turned forward onto the cylinder, as in broken lines, Fig. 2, and the position of the reproducer with relation to the recorder is such that the working-point of the reproducer will come into line with the spiral groove produced by the recorder in the cylinder, and therefore be certain to follow that groove.

The recorder and reproducer both move positively with the bracket, and their proper location is insured by the nut J, engaging the leading-screw, so that wherever the bracket is located the reproducer is certain to find a corresponding position in the groove produced in the cylinder.

From each ear $d\ d$, in which the reproducer is hung, tubular projections $f$ are applied stationary in the ears, and to which hearing-tubes may be attached to convey the reproduced sound to the ears.

I have represented the ledge S on the bracket-arms as extending from the extreme rear of the bracket-arms; but this extent is not required, as they may be of any suitable length or in any desired position between the extreme front and rear resting points of the trunnion, so that the recorder forward of the trunnions may rest thereon when in the rear position, and so as to support the recorder in its up or non-working position.

The lugs T may be omitted; but some stop to prevent the accidental rear movement of the recorder is desirable.

While I prefer to employ the tubular shaft for the support and movement of the bracket, it will be evident that the tubular shaft may be omitted and the bracket arranged to slide directly on the leading-screw, the bracket being supported to prevent its swinging or oscillating upon the leading-screw. Such a modification is represented in Fig. 5. For the support of the bracket to prevent such swinging movement an arm $g$ projects from the sleeve and slides upon a stationary rod $h$, parallel with the leading-screw; but, as before stated and for obvious reasons, the stationary tubular shaft is preferred.

I claim—

1. In a graphophone, in combination with the leading-screw and cylinder, a bracket arranged upon the leading-screw, the said bracket consisting of a sleeve adapted to slide on said leading-screw and constructed with downwardly-projecting arms, the arms below the screw constructed with horizontal grooves upon their inner faces, a recorder the body of which is adapted to pass between the said arms and constructed with trunnions extending into said grooves and so as to work therein, and whereby the said recorder may be thrown rearward away from the cylinder or drawn forward and dropped upon the cylinder without detachment from said bracket, a reproducer hung upon said bracket and so as to swing in a vertical plane, it being adapted to engage with the groove formed in the cylinder by the recorder, and whereby the said reproducer may be thrown out of or into engagement with the said cylinder without detachment from said bracket, with mechanism, substantially such as described, to engage said bracket with the leading-screw or disengage it therefrom, substantially as described.

2. In a graphophone, in combination with the leading-screw and cylinder, a bracket arranged upon the leading-screw, the said bracket consisting of a sleeve adapted to slide longitudinally on said leading-screw, with arms extending downward from said sleeve, the arms constructed with horizontal slots on their inner faces, said slots closed at their forward ends but open at their rear ends, a recorder adapted to pass between said arms and constructed with trunnions corresponding to and so as to work in said grooves of the bracket in the backward and forward movement of said recorder, the arms constructed with rests below the grooves for the support of the recorder when in its non-working position, a reproducer hung upon said bracket so as to swing in a vertical plane, and mechanism, substantially such as described, adapted to engage said bracket with or disengage it from said leading-screw, substantially as described.

3. In a graphophone, in combination with the leading-screw and cylinder, a bracket arranged upon the leading-screw, the said bracket consisting of a sleeve adapted to travel longitudinally on said leading-screw and constructed with downwardly-projecting arms, the said arms constructed with horizontal grooves N upon their inner faces, a recorder constructed with trunnions supported in said grooves and so that the said recorder may be moved forward and backward into or out of engagement with the cylinder, a stop T forward of said bracket and against which the rear edge of the recorder may rest when in its working position, a reproducer hung to the said bracket and so as to swing in a vertical plane to bring the reproducer into or out of engagement with the said cylinder, with mechanism, substantially such as described, to engage said bracket with or disengage it from said leading-screw, substantially as described.

4. In a graphophone, in combination with the leading-screw and cylinder, a stationary tubular shaft C, arranged around the leading-screw, the said shaft constructed with a longitudinal slot opening to said screw, a bracket arranged upon said shaft and so as to slide longitudinally thereon, the bracket constructed with downwardly-projecting arms adapted to carry the recorder, a reproducer hung to said bracket and so as to swing in a vertical plane to bring the reproducer into engagement with the cylinder or take it from such engagement, as the case may be, a lever F G hung upon said bracket, one arm serving as a handle, and a nut J, hung to the other arm, said nut arranged in the said slot of the tubular shaft and adapted by the swinging movement of the lever to bring the said nut into or out of engagement with the leading-screw, substantially as described.

5. In a graphophone, in combination with the leading-screw and cylinder, a bracket arranged upon the leading-screw so as to move longitudinally thereon, mechanism, substantially such as described, to engage said bracket with or disengage it from said leading-screw, the said bracket constructed with downwardly-projecting arms, a recorder hung upon trunnions between said arms, and a reproducer hung between ears on said bracket and so as to swing in a vertical plane, the said ears constructed with tubular projections $f$ in line with and against which the axle of the reproducer bears, substantially as described.

JOSEPH DANIELS.

Witnesses:
JOHN E. EARLE,
FRED. C. EARLE.